United States Patent
Pallu

(10) Patent No.: US 9,845,082 B2
(45) Date of Patent: Dec. 19, 2017

(54) LOWER AERODYNAMIC SCREEN OF A FRONT SHIELD OF A MOTOR VEHICLE

(71) Applicant: RENAULT s.a.s., Boulogne-Billancourt (FR)

(72) Inventor: Gilles Pallu, Andely (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 147 days.

(21) Appl. No.: 14/442,293

(22) PCT Filed: Oct. 14, 2013

(86) PCT No.: PCT/FR2013/052445
§ 371 (c)(1),
(2) Date: May 12, 2015

(87) PCT Pub. No.: WO2014/072598
PCT Pub. Date: May 15, 2014

(65) Prior Publication Data
US 2016/0244032 A1  Aug. 25, 2016

(30) Foreign Application Priority Data
Nov. 12, 2012 (FR) ...................... 12 60745

(51) Int. Cl.
*B60T 5/00* (2006.01)
*B62D 35/00* (2006.01)
(Continued)

(52) U.S. Cl.
CPC .............. *B60T 5/00* (2013.01); *B62D 35/005* (2013.01); *B62D 35/02* (2013.01); *F16D 65/847* (2013.01); *Y02T 10/88* (2013.01)

(58) Field of Classification Search
CPC ...... B62D 35/00; B62D 35/001; B62D 35/02; B62D 35/007; B62D 37/02; B62D 35/005; B62D 25/16; F15D 1/10; F15D 1/12
(Continued)

(56) References Cited

U.S. PATENT DOCUMENTS 5,322,340 A *  6/1994  Sato ................... B62D 25/20
                                                          180/68.1
5,513,893 A *  5/1996  Nakata et al. ......... B62D 35/02
                                                          180/68.2
(Continued)

FOREIGN PATENT DOCUMENTS

DE         42 29 945       3/1994
DE    10 2009 050 967      5/2011
(Continued)

OTHER PUBLICATIONS

International Search Report dated Oct. 24, 2014, in PCT/FR13/052445 filed Oct. 14, 2013.
(Continued)

*Primary Examiner* — Glenn Dayoan
*Assistant Examiner* — Sunsurraye Westbrook
(74) *Attorney, Agent, or Firm* — Oblon, McClelland, Maier & Neustadt, L.L.P.

(57) ABSTRACT

A lower aerodynamic screen of a front shield of a motor vehicle includes lateral air guides shaped to channel air passing under the aerodynamic screen towards front disc brakes of the vehicle, wherein each air guide is defined by two substantially vertical lateral walls and by an upper wall linked to upper edges of the lateral walls, the air guide being provided, downstream relative to a direction of flow of the air, with a window defined by rear edges of the lateral walls and the upper wall, from which the air emerges towards the
(Continued)

disc brakes, the air guide further including a flap that is movable between a position in which it blocks the window and a position in which it is retracted from the window.

9 Claims, 2 Drawing Sheets

(51) Int. Cl.
  *B62D 35/02* (2006.01)
  *F16D 65/847* (2006.01)
(58) Field of Classification Search
  USPC .......... 296/181.5, 180.1, 181.1, 209, 21, 91, 296/151; 180/903, 291, 68.1, 211, 309
  See application file for complete search history.

(56) References Cited

U.S. PATENT DOCUMENTS

| 6,435,298 | B1* | 8/2002 | Mizuno et al. ........ B62D 35/02 180/346 |
| 6,726,273 | B2* | 4/2004 | Kruschhausen et al. ...................... B62D 35/02 180/69.1 |
| 7,275,611 | B2* | 10/2007 | Rijsbergen et al. ... B62D 35/02 180/68.1 |
| 8,668,245 | B2* | 3/2014 | Kakiuchi et al. ...... B62D 35/02 180/69.1 |
| 8,814,251 | B2* | 8/2014 | Matsuyama et al. .. B62D 35/02 180/69.1 |

FOREIGN PATENT DOCUMENTS

| FR | 2 959 195 | 10/2011 |
| FR | 2 959 473 | 11/2011 |
| WO | 2012 084251 | 6/2012 |

OTHER PUBLICATIONS

French Search Report dated Jul. 2, 2013 in Application No. FR 1260745 filed Nov. 12, 2012.

* cited by examiner

LOWER AERODYNAMIC SCREEN OF A FRONT SHIELD OF A MOTOR VEHICLE

DOMAIN OF THE INVENTION

The present invention relates to a lower aerodynamic screen of a front shield of a motor vehicle. The invention relates more specifically to such an aerodynamic screen having lateral air guides shaped to channel the air passing beneath the aerodynamic screen towards the disc brakes associated with the front wheels of the vehicle.

PRIOR ART

Numerous vehicles on the market have a lower aerodynamic screen of a front shield. Such screens are intended to obviate the recirculation of air beneath a vehicle to improve aerodynamics and to limit disturbances in air flow to the cooling unit of the powertrain. The screen is located behind the shield, in the lower portion of same, and extends substantially along the entire width of same.

Providing this aerodynamic screen with lateral air guides to channel part of the air flowing beneath the screen towards the disc brakes associated with the front wheels of the vehicle is also known. These guides are also known as "brake scoops" to the person skilled in the art. An air guide is therefore positioned upstream of each disc brake, in relation to the direction of air flow relative to the vehicle.

Depending on vehicle layout, it is sometimes necessary to permit air to flow in these brake scoops or guides, for example if the shield does not have a flexible lower strip. Conversely, in other vehicle layouts, it is necessary to close this air guide, typically if the shield has a flexible lower strip. This involves making different models of aerodynamic screen, which generates significant manufacturing costs and does not facilitate a reduction in diversity (several parts to be designed, several molds to be made, dual sourcing and selection of screen type to be assembled on each vehicle).

PURPOSE OF THE INVENTION

The invention is intended to overcome all or some of the aforementioned drawbacks by proposing a lower aerodynamic screen of a front shield of a vehicle that is suitable for all vehicle types.

SUBJECT MATTER OF THE INVENTION

For this purpose, the invention relates to a lower aerodynamic screen of a front shield of a motor vehicle comprising lateral air guides shaped to channel the air passing beneath the aerodynamic screen towards the front disc brakes of the vehicle, each air guide being defined by two substantially vertical lateral walls and by an upper wall linked to the upper edges of the lateral walls, the air guide being provided, downstream in the direction of air flow, with a window defined by the rear edges of the lateral walls and the upper wall, from which the air emerges towards the disc brakes, the air guide further comprising a flap that is movable between a position blocking the window and a position in which it is retracted from the window, characterized in that each flap is held selectively in the blocking position or in the retracted position by stapling means or clipping means.

A single screen according to the invention can therefore be adapted to all vehicle types, since the air guides can be selectively positioned in two layouts enabling the air flow towards the disc brakes to be blocked or opened. The invention enables diversity and a significant reduction in manufacturing costs.

According to other advantageous features of the invention:
- each flap is articulated on the rear edge of the upper wall, notably by a film hinge,
- each flap has a central portion facing the window such as to block same, and lateral portions projecting laterally from the central portion, these lateral portions bearing flat against the lower blank of each guide located laterally on either side of the window, when the flap is in the blocking position, the flap being held in this position by staples rigidly joining the lateral portions of the flap and the lower blanks of the guide in pairs,
- each flap has lateral attachment lugs that are formed on the longitudinal prolongation of the lateral portions and that are substantially perpendicular to the central portion, these lateral attachment lugs bearing against the upper blanks formed on the guide when the flap is in the position retracted from the window, the flap being held in this position by staples rigidly joining the attachment lugs of the flap and the upper blanks of the guide in pairs,
- the flap in the position retracted from the window is turned above the guide about the articulation of same, the main portion of same bearing against the upper wall of the guide, on the side opposite the air flow zone,
- the upper blanks of the guide are arranged on formations projecting above the upper wall,
- the window of each of the guides is contained within a substantially vertical plane,
- the upper wall of the guide is inclined from the horizontal, the lateral walls having a generally triangular shape, such that the volume defined by these walls is generally prismatic, and
- the aerodynamic screen is made of injected plastic, the position of the flap when removed from the mold being such that the main portion is substantially perpendicular to the plane of the window and to the upper and lower blanks of the guide.

BRIEF DESCRIPTION OF THE DRAWINGS:

The invention can be better understood from the following description of a nonlimiting example of the invention, with reference to the attached drawings in which.

DETAILED DESCRIPTION

In the description below, directions are indicated with reference to the orthogonal basis XYZ conventionally used in vehicle design, in which X refers to the longitudinal direction of the vehicle, oriented backwards, Y the transverse direction, oriented towards the right, and Z the vertical direction, oriented upwards. The concepts of "front" and "rear" are indicated with reference to the longitudinal front-rear orientation of the vehicle.

Furthermore, the term "substantially" indicates that a small variation of a few centimeters or degrees is possible in relation to the dimensions or directions indicated.

Figure 1:
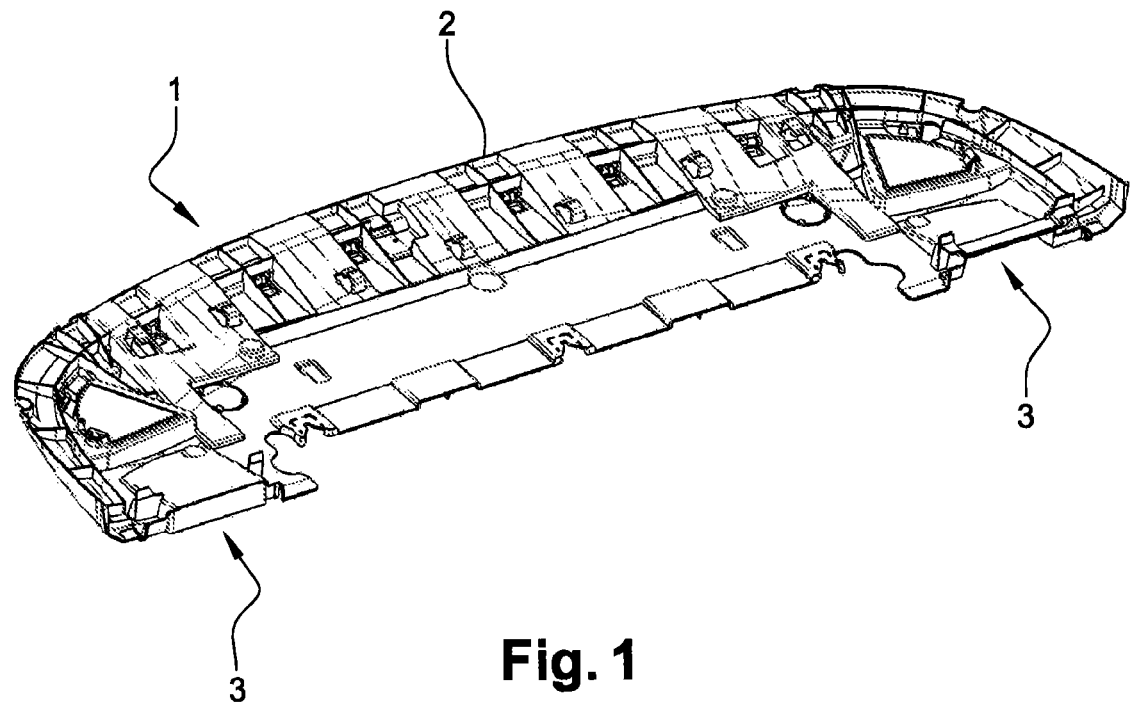
FIG. 1 is a perspective view of a lower aerodynamic screen of a front shield of a vehicle according to the invention.

FIG. 1 is an overview of an aerodynamic screen 1 according to the invention. This screen is located behind the front shield of a motor vehicle and in the lower portion of same. It is oriented substantially horizontally. The front edge 2 of same is designed to fit the lower wall of the shield (this latter is not shown).

Figure 2:
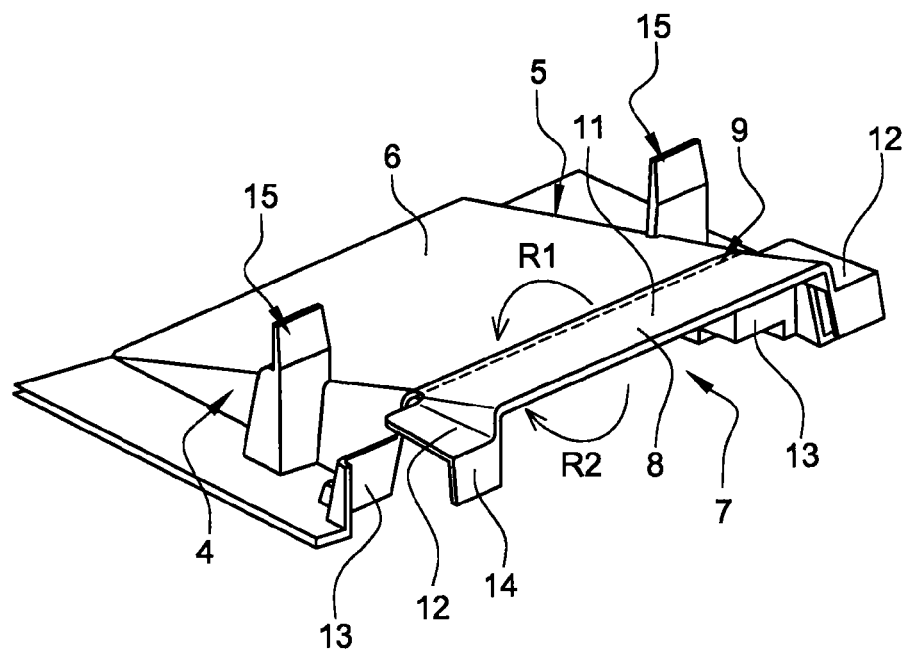
FIG. 2 is a detail from FIG. 1 showing only the zone of an air guide in demolded position.

The screen 1 extends across the entire width of the shield and has air guides 3 (or "scoops") on the rear and lateral portions of same that are shaped to channel the air passing beneath the aerodynamic screen towards the front disc brakes (not shown) of the vehicle. FIG. 2 is a magnified view of a detail of the screen in FIG. 1 specifically showing an air guide 3. This defines an air flow channel located beneath the guide. The guide has two substantially vertical lateral walls 4, 5 and an upper wall 6 linked to the upper edges of the side walls. The air guide 3 has, downstream in relation to the direction of air flow, a window 7 delimited by the rear edges of the side walls 4, 5 and of the upper wall 6. This window typically takes the form of a rectangle through which the air escapes from the air guide 3 when the passage is open. This window 7 is oriented substantially vertically.

According to the embodiment shown in the figures, the upper wall 6 of the guide is inclined from the horizontal, the lateral walls 4, 5 having a generally triangular shape, such that the volume defined by these walls 4-6 is generally prismatic. This incline is typically between 10° and 45°, for example around 30°. The air flowing beneath the screen in the zone of each guide 3 can therefore rise progressively in the width of the aerodynamic screen 1 as it moves towards the rear of the vehicle, such as to be directed towards the disc brakes.

According to the invention, the air guide 3 includes a flap 8 that is movable between a position blocking the window 7 and a position retracted from the window 7. These two positions of the flap 8 are shown respectively in FIGS. 4 and 3. The position "retracted" from the window means that the flap 8 is retracted or stowed away from the air flow zone when air is flowing through the window 7.

The flap 8 is articulated on the rear edge of the upper wall 6, typically by a film hinge 9 (FIG. 2).

The screen 1 is made of injected plastic. On removal from the mold, the flap 8 of each guide 3 is entirely within a plane substantially perpendicular to the plane of the window 7, as shown in FIG. 2. On removal from the mold, the flap 8 is substantially parallel to the general orientation of the aerodynamic screen 1.

The flap 8 is moved from the position on same on removal from the mold (FIG. 2) either towards the position retracted from the window 7 (FIG. 3) or towards the position blocking the window 7 (FIG. 4) by rotating same about the film hinge 9 respectively in the direction of arrow R1 or R2, as indicated in FIG. 2. Rotation in the direction of the arrow R1 is typically through an angle of at least 30°. Rotation in the direction of the arrow R2 is typically through an angle of substantially 90°.

Each flap 8 is held selectively in the blocking position or in the retracted position by stapling means 10. In an alternative embodiment of the invention not shown, the stapling means may be replaced or complemented by clipping means permanently attaching the flap 8 or the pre-retainer of same in the desired position.

These stapling means 10 rigidly join the specific zones of the flap 8 and a static portion of the air guide, as set out below.

Figure 4:
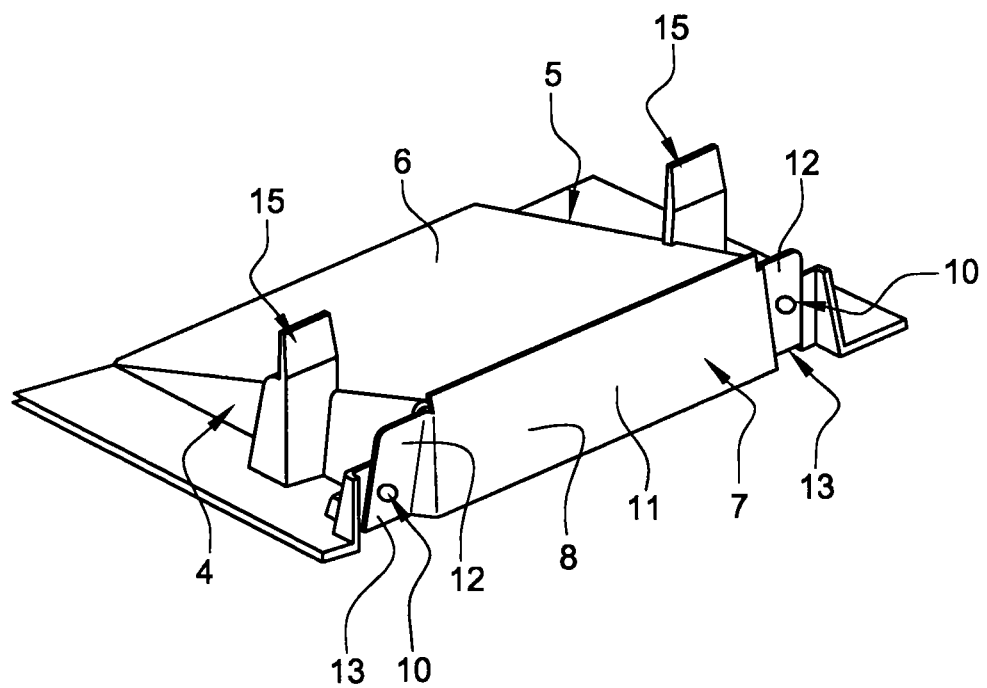
FIG. 4 is a view of the air guide in FIG. 2, in which the flap is in a position blocking the window.

Each flap 8 has a central portion 11 facing the window such as to block same when the flap is in the blocking position (FIG. 4). The flap 8 also has lateral portions 12 projecting laterally, i.e. in the direction Y, from the central portion 11. When the flap 8 is in the blocking position, as shown in FIG. 4, the lateral portions 12 bear flat against the lower blanks 13 formed on each guide 3 on either side of the window 7 in the direction Y. The lower blanks 13 are parallel to the window 7. These lower blanks are oriented substantially perpendicular to the plane of the screen 1. The flap 8 is held in this blocking position by staples 10 rigidly joining the lateral portions 12 of the flap 8 and the lower blanks 13 of the guide 3 in pairs.

Figure 3:
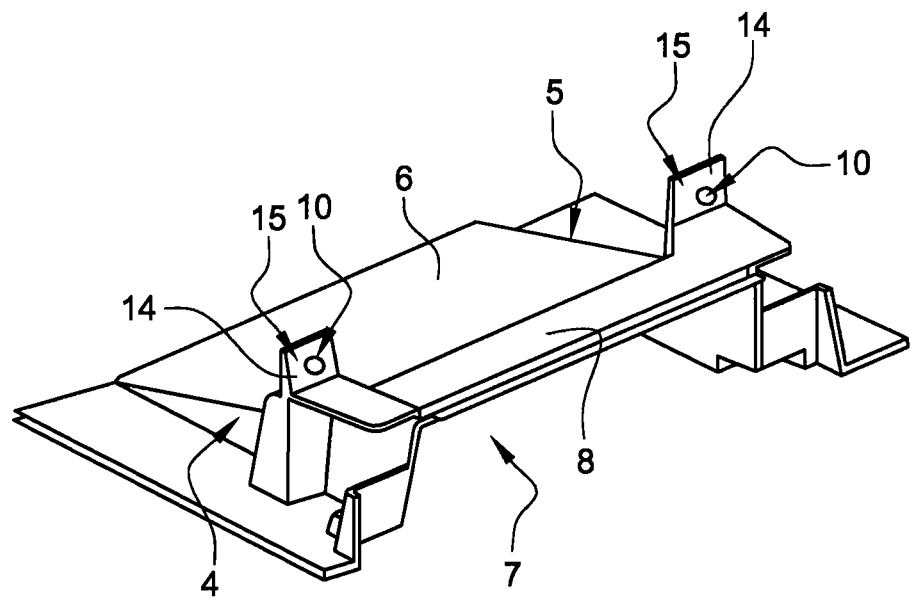
FIG. 3 is a view of the air guide in FIG. 2, in which the flap is in a position retracted from the window.

Each flap 8 also has lateral attachment lugs 14 formed in the longitudinal prolongation of the lateral portions 12. These attachment lugs 14 are formed substantially perpendicular to the central portion 11 and to the lateral portions 12. When the flap 8 is in the position retracted from the window 7, as shown in FIG. 3, enabling air to flow through this window 7, the attachment lugs 14 cooperate bearingly against the upper blanks 15 formed on the guide 3. The flap 8 is held in this retracted position by staples 10 rigidly joining the attachment lugs 14 of the flap 8 and the upper blanks 15 of the air guide 3 in pairs.

The upper blanks 15 of the air guide 3 are arranged on formations projecting above the upper wall 6. These upper blanks 15 are arranged in front of and above the lower blanks 13.

The flap 8 in the position retracted from the window is turned above the guide 3 about the articulation of same formed by the film hinge 9. In this position, the main portion 11 of the flap 8 is positioned substantially parallel, or even bearing against the upper wall 6 of the guide 3, on the side opposite the air flow zone, which is located beneath the upper wall 6.

Naturally, the invention is not limited to the embodiments or variants described above and includes all technical equivalents to these means.

The invention claimed is:

1. A lower aerodynamic screen of a front shield of a motor vehicle, comprising:
lateral air guides shaped to channel air passing beneath the aerodynamic screen towards front disc brakes of the vehicle,
each air guide being defined by two substantially vertical lateral walls and by an upper wall linked to upper edges of the lateral walls, each of the lateral walls and the upper wall extending from a front edge of the lateral air guide to a rear edge of the lateral air guide,
the air guide including, downstream in a direction of air flow, a window defined by rear edges of the lateral walls and a rear edge of the upper wall, from which the air emerges towards the disc brakes,
the air guide further comprising.a flap that is attached to the rear edge of the upper wall to rotate around the rear edge of the upper wall between a blocking position blocking the window and a retracted position in which it is retracted from the window, wherein each flap is held selectively in the blocking position or in the retracted position by stapling means or clipping means,
each flap comprising a central portion, lateral portions that project laterally outward from the central portion, and a longitudinal prolongation extending longitudinally from each of the lateral portions,
the air guide further comprising lower blanks that extend laterally outward from the rear edges of the lateral walls and upper blanks extending laterally outward and upward from the lateral wall at a position in front of the lower blanks, the lateral portions of the flap being in contact with the lower blanks when the flap is in the blocking position, and the longitudinal prolongations of the flap being in contact with the upper blanks when the flap is in the retracted position.

2. The aerodynamic screen as claimed in claim 1, wherein each flap is rotatably attached to the rear edge of the upper wall by a film hinge.

3. The aerodynamic screen as claimed in claim 2, wherein the flap is held in the blocking position by staples rigidly joining the lateral portions of the flap and the lower blanks of the guide in pairs.

4. The aerodynamic screen as claimed in claim 3, wherein each flap includes lateral attachment lugs that are formed on the longitudinal prolongations, the lateral attachment lugs bearing against the upper blanks formed on the guide when the flap is in the retracted position, the flap being held in the retracted position by staples rigidly joining the lateral attachment lugs of the flap and the upper blanks of the guide in pairs.

5. The aerodynamic screen as claimed in claim 4, wherein the flap in the retracted position is turned above the guide via an articulation of the flap, the central portion of the flap bears against the upper wall of the guide, on a side opposite the air flow zone.

6. The aerodynamic screen as claimed in claim 1, wherein the window of each of the guides is contained within a substantially vertical plane.

7. The aerodynamic screen as claimed in claim 6, wherein the aerodynamic screen is made of injected plastic, a position of the flap when removed from the mold being such that a main portion is substantially perpendicular to the plane of the window and to the upper and lower blanks of the guide.

8. The aerodynamic screen as claimed in claim 1, wherein the upper wall of the guide is inclined from the horizontal, the lateral walls having a generally triangular shape, such that the volume defined by the walls is generally prismatic.

9. The aerodynamic screen as claimed in claim 1, wherein the flap in the retracted position is positioned above a top surface of the upper wall of the guide, on a side opposite the air flow zone.

* * * * *